US 11,741,946 B2

United States Patent
Saon et al.

(10) Patent No.: US 11,741,946 B2
(45) Date of Patent: Aug. 29, 2023

(54) MULTIPLICATIVE INTEGRATION IN NEURAL NETWORK TRANSDUCER MODELS FOR END-TO-END SPEECH RECOGNITION

(71) Applicant: International Business Machines Corporation, Armonk, NY (US)

(72) Inventors: George Andrei Saon, Stamford, CT (US); Daniel Bolanos, Mohegan Lake, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 449 days.

(21) Appl. No.: 16/999,405

(22) Filed: Aug. 21, 2020

(65) Prior Publication Data

US 2022/0059082 A1  Feb. 24, 2022

(51) Int. Cl.
| | | |
|---|---|---|
| *G10L 15/16* | (2006.01) | |
| *G06F 17/18* | (2006.01) | |
| *G06N 3/08* | (2023.01) | |
| *G06N 3/045* | (2023.01) | |
| *G06N 5/046* | (2023.01) | |

(52) U.S. Cl.
CPC ............. *G10L 15/16* (2013.01); *G06F 17/18* (2013.01); *G06N 3/045* (2023.01); *G06N 3/08* (2013.01); *G06N 5/046* (2013.01)

(58) Field of Classification Search
CPC ....... G10L 15/16; G10L 15/063; G06F 17/18; G06N 3/0454; G06N 3/08; G06N 5/046; G06N 3/0445
See application file for complete search history.

(56) References Cited

U.S. PATENT DOCUMENTS

| | | | |
|---|---|---|---|
| 11,126,896 B2* | 9/2021 | Voloshynovskiy | ... G06F 18/241 |
| 2021/0312905 A1* | 10/2021 | Zhao | ............. G06N 3/0445 |
| 2021/0350786 A1* | 11/2021 | Chen | ............. G10L 15/063 |

OTHER PUBLICATIONS

Wang et al, An Overview of End to End Automatic Speech Recognition, Symmetry 2019, Jun. 30, 2019, vol. 11, No. 8. (Year: 2019).*

(Continued)

*Primary Examiner* — Linda Wong
(74) *Attorney, Agent, or Firm* — Garg Law Firm, PLLC; Rakesh Garg; Peter Edwards (57) ABSTRACT

Using an encoder neural network model, an encoder vector is computed, the encoder vector comprising a vector representation of a current portion of input data in an input sequence. Using a prediction neural network model, a prediction vector is predicted, the prediction performed using a previous prediction vector and a previous output symbol corresponding to a previous portion of input data in the input sequence. Using a joint neural network model, a joint vector corresponding to the encoder vector and the prediction vector is computed, the joint vector multiplicatively combining each element of the encoder vector with a corresponding element of the prediction vector. Using a softmax function, the joint vector is converted to a probability distribution comprising a probability that a current output symbol corresponds to the current portion of input data in the input sequence.

16 Claims, 8 Drawing Sheets

(56) References Cited

OTHER PUBLICATIONS

Bin Wang et al, Attention-based Transducer for Online Speech Recognition, https://arxiv.org/abs/2005.08497, May 18, 2020 (Year: 2020).*

Meng et al, Internal Language Model Training for Domain Adaptive End to End Speech Recognition, ICASSP 2021-2021 IEEE International Conference on Acoustics, Speech and Signal Processing (ICASSP), Jun. 6-11, 2021 (Year: 2021).*

Graves et al., Speech recognition with deep recurrent neural networks, ICASSP, IEEE International Conference on Acoustics, Speech and Signal Processing—Proceedings 1999 IEEE, IEEE, May 26, 2013, pp. 6645-6649.

Wang et al., An Overview of End-to-End Automatic Speech Recognition, Symmetry, vol. 11, No. 8, Aug. 7, 2019.

Conneau et al., Supervised Learning of Universal Sentence Representations from Natural Language Inference Data, Proceedings of the 2017 Conference on Empirical Methods in Natural Language Processing, Jul. 21, 2017.

Zhang et al., Deep Fusion: An Attention Guided Factorized Bilinear Pooling for Audio-video Emotion Recognition, 2019 International Joint Conference on Neural Networks (IJCNN), Jul. 14, 2019.

Blandfort et al., Fusion Strategies for Learning User Embeddings with Neural Networks, 2019 International Joint Conference on Neural Networks (IJCNN), Jul. 14, 2019.

Wu et al., On Multiplicative Integration with Recurrent Neural Networks, arxiv.org, Cornell University Library, 201, Olin Library Cornell University, Ithaca, NY, 14853, Jun. 21, 2016.

International Searching Authority, PCT/EP2021/072175, dated Nov. 23, 2021.

Levine et al., "On the Long-Term Memory of Deep Recurrent Networks", Jun. 6, 2018, https://arxiv.org/abs/1710.09431v2.

Graves, "Sequence transduction with recurrent neural networks", arXiv, 2012.

Wu et al., "On multiplicative integration with recurrent neural networks", Advances in neural information processing systems, 2016.

* cited by examiner

MULTIPLICATIVE INTEGRATION IN NEURAL NETWORK TRANSDUCER MODELS FOR END-TO-END SPEECH RECOGNITION

BACKGROUND

The present invention relates generally to a method, system, and computer program product for neural network based end-to-end speech recognition. More particularly, the present invention relates to a method, system, and computer program product for multiplicative integration in neural network transducer models for end-to-end speech recognition.

An embedding is a learned multi-dimensional representation of discrete data as a continuous vector. Because embeddings that are close to each other in the vector space represent corresponding inputs that are similar to each other in some way, embeddings are often used in neural network models to evaluate similarities of inputs, categorize inputs, convert data to a common numerical form for input into another model, and other purposes.

Automatic speech recognition identifies, or labels, an input sequence of portions of audio data, producing an output sequence of symbols (e.g. letters, Asian-language characters, words, or morphemes) corresponding to the input sequence. In other words, automatic speech recognition converts audio data to narrative text form.

An end-to-end speech recognition model uses a single model to directly map audio to characters or words. End-to-end models are trained from audio data and corresponding narrative text transcripts, without a need for pronunciation dictionaries and other subject matter-specific information sources that might be expensive, inaccurate, incomplete, or unavailable for a particular language. End-to-end models also require fewer training steps than previous models such as hybrid models. In addition, end-to-end models have higher accuracy, use less memory, and produce results faster than hybrid models. Thus, end-to-end models have become popular recently.

A transducer model is one type of end-to-end model used in speech recognition applications. A typical transducer model includes an encoder or transcription network, prediction network, and a joint network. The encoder is an acoustic model that is trained to process audio data, the prediction network is a language model that is trained to predict language information from previous predictions and corresponding model outputs, and the joint network is trained to combine encoder and prediction network results to produce a final output.

Presently-available joint network implementations compute network output by adding weighted components together. However, these implementations do not sufficiently model interactions between the results of the acoustic and language models. Thus, the illustrative embodiments recognize that there is an unmet need for a better model of the interactions between the results of the acoustic and language models, incorporating both additive terms and second order interactions, as well as improved control of the magnitude of network changes during model training and reducing the error rate of the complete end-to-end model.

SUMMARY

The illustrative embodiments provide a method, system, and computer program product. An embodiment includes a method that computes, using an encoder neural network model, an encoder vector, the encoder vector comprising a vector representation of a current portion of input data in an input sequence. An embodiment predicts, using a prediction neural network model, a prediction vector, the prediction performed using a previous prediction vector and a previous output symbol corresponding to a previous portion of input data in the input sequence. An embodiment computes, using a joint neural network model, a joint vector corresponding to the encoder vector and the prediction vector, the joint vector multiplicatively combining each element of the encoder vector with a corresponding element of the prediction vector. An embodiment converts, using a softmax function, the joint vector to a probability distribution comprising a probability that a current output symbol corresponds to the current portion of input data in the input sequence. Thus, the embodiment provides a method of multiplicative element combination in neural network transducer models for end-to-end speech recognition.

In another embodiment, the joint vector multiplicatively combines each weighted element of the encoder vector with a corresponding weighted element of the prediction vector, the weighted elements of the encoder vector determined according to a set of encoder weights and the weighted elements of the prediction vector determined according a set of prediction weights. Thus, the embodiment provides a particular manner of combining each weighted element of the encoder vector with a corresponding weighted element of the prediction vector.

In another embodiment, the set of encoder weights corresponds to a first linear layer of the joint neural network model. Thus, the embodiment provides a particular manner of determining the set of encoder weights.

In another embodiment, training the joint neural network model comprises setting the set of encoder weights. Thus, the embodiment provides a particular manner of determining the set of encoder weights.

In another embodiment, the set of prediction weights corresponds to a second linear layer of the joint neural network model. Thus, the embodiment provides a particular manner of determining the set of prediction weights.

In another embodiment, training the joint neural network model comprises setting the set of prediction weights. Thus, the embodiment provides a particular manner of determining the set of prediction weights.

In another embodiment, the joint vector is weighted by a set of output weights corresponding to a third linear layer of the joint neural network model. Thus, the embodiment provides a particular manner of determining the joint vector.

In another embodiment, training the joint neural network model comprises setting the set of output weights. Thus, the embodiment provides a particular manner of determining the set of output weights.

In another embodiment, the joint neural network model further comprises a bias vector. Thus, the embodiment provides a particular manner of determining the joint vector.

In another embodiment, training the joint neural network model comprises setting a set of values of elements of the bias vector. Thus, the embodiment provides a particular manner of determining the bias vector.

In another embodiment, the current portion of input data comprises a portion of audio data and the input sequence comprises a set of sequential portions of audio data. Thus, the embodiment provides a particular manner of multiplicative element combination with audio data as the input data.

In another embodiment, the current output symbol comprises a textual unit corresponding to the portion of audio data. Thus, the embodiment provides a particular manner of producing a textual unit corresponding to audio data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that there is an unmet need for a better model of the interactions between the results of the acoustic and language models, incorporating both additive terms and second order interactions, improved control of the magnitude of network changes during model training, and reducing the error rate of the complete end-to-end model.

The illustrative embodiments recognize that the presently available tools or solutions do not address these needs or provide adequate solutions for these needs. The illustrative embodiments used to describe the invention generally address and solve the above-described problems and other problems related to multiplicative integration in neural network transducer models for end-to-end speech recognition.

An embodiment can be implemented as a software application. The application implementing an embodiment can be configured as a modification of an existing speech recognition system, as a separate application that operates in conjunction with an existing speech recognition system, a standalone application, or some combination thereof.

Particularly, some illustrative embodiments provide a method that receives an input sequence of audio data, computes an encoder vector and a prediction vector, computes a joint vector combining the encoder and prediction vectors, and converts the joint vector to a probability that a particular symbol corresponds to a portion of input data.

An embodiment receives, as input, a sequence of portions of audio data. The input sequence is represented symbolically herein as $x=(x_1, \ldots, x_T)$.

In one embodiment, the audio data is in spectrogram form. A spectrogram is a visual representation of the frequencies within audio data over time, for example with one axis representing time, a second axis representing frequencies, and different colors or intensity values representing an amplitude of a frequency at a particular time. Typically, audio data is divided into smaller frames, or portions, each including spectrogram data for a predetermined time period. One non-limiting example of such a predetermined time period is 10 milliseconds, although shorter and longer time periods are also possible and contemplated within the scope of the illustrative embodiments. Thus, each element of the input sequence $x=(x_1, \ldots, x_T)$ represents a portion of audio data, and x represents a set of sequential portions of audio data, $x_1, \ldots, x_T$, received between time 1 and ending time T. One embodiment obtains audio data using a microphone and processes the data into spectrogram form using any presently-known frequency analysis technique. Another embodiment receives the audio data already in spectrogram form. Other embodiments generate audio data, or receive already-generated input audio data, in another format.

An embodiment generates an output sequence of symbols corresponding to the input sequence. There need not be a one to one correspondence between an element of the input sequence and an element of the output sequence. Instead, a group of input frames can be labelled by one or more output symbols, and the input sequence is often much longer than the output sequence. For example, in English the frames corresponding to the sound /sh/ are labeled by two characters s and h. The output sequence is represented symbolically herein as $y=(y_1, \ldots, y_U)$. Some non-limiting examples of an output symbol are letters, Asian-language characters, words, or morphemes. An output symbol can also be the BLANK symbol. The BLANK symbol means that the model decided to output nothing at that time step, while advancing the input from t to t+1.

An embodiment includes an encoder network, implemented as a neural network model. In embodiments, the encoder network is implemented as any type of neural network. Some non-limiting examples of encoder network neural network implementations are a deep feed-forward neural network (DNN), convolutional neural network (CNN), a recurrent neural network (RNN), special types of RNN such as a long short-term memory (LSTM) and gated recurrent units (GRUs), and a transformer network. The encoder network generates a sequence of embeddings, with each embedding corresponding to an input in the input sequence. Embeddings computed by the encoder network improve the speech recognition model's discrimination between individual speech sounds. The sequence of embeddings generated by the encoder network is represented symbolically herein as $h=(h_1, \ldots, h_{T'})$, in which T' is an ending time less than or equal to ending time T of the input sequence. T' can be less than T because the encoder network is able to subsample the input sequence, resulting in a generated embedding sequence that is shorter than the input sequence. In one embodiment, the encoder network is trained to generate embeddings as part of a training process of the entire end-to-end speech recognition model. One non-limiting example of training the end-to-end speech recognition model uses a negative log-posterior loss objective function: $-\log[P(y|x)]$. In another embodiment, the encoder network is pretrained using a different loss function, for example cross-entropy (CE) or connectionist temporal classification (CTC), then incorporated into the end-to-end speech recognition model for possible additional training.

An embodiment includes a prediction network, implemented as a neural network model. Some non-limiting examples of prediction network neural network implementations are an RNN, special types of RNN such as LSTM and GRUs, and causal convolutional nets. The prediction network generates a sequence of embeddings, represented symbolically herein as $g=(g_1, \ldots, g_U)$. Each embedding is based on a previous output symbol in the output sequence and the corresponding previous prediction. In particular, the prediction network implements a recursive function $g_u=\text{prediction}(g_{u-1}, y_{u-1})$, which has two inputs, the previous output symbol $y_{u-1}$ and the previous embedding $g_{u-1}$. In one embodiment, the prediction network is trained to generate embeddings as part of a training process of the entire end-to-end speech recognition model.

An embodiment includes a joint network, implemented as a neural network model. In one embodiment, the joint network is implemented as a feed-forward (i.e. nonrecurrent) network. Other implementations, such as a convolutional neural network, are also possible and contemplated within the scope of the illustrative embodiments. In an embodiment, the joint network includes three linear layers, each including a set of weighted elements. Values of the weighted elements are set during model training, and are represented symbolically herein as matrices $W_{enc}$, $W_{pred}$, and $W_{out}$. Another embodiment includes more than three linear layers, with additional corresponding matrices of weighted elements. The joint network also implements a bias parameter, represented symbolically herein as b, also set during model training. The bias parameter is a vector, with the same number of dimensions as the embeddings that are output from the encoder and prediction networks. In one embodiment, the joint network is trained to generate embeddings as part of a training process of the entire end-to-end speech recognition model.

The joint network generates a sequence of embeddings, with each embedding based on corresponding outputs of the encoder and prediction networks. The sequence of embeddings generated by the joint network is represented symbolically herein as $z_{t,u}$.

A presently-known implementation of the joint network generates a sequence of embeddings using the expression $z_{t,u}=W_{out}\tanh(W_{enc}h_t+W_{pred}g_u+b)$, where tanh( ) represents the hyperbolic tangent function. An embodiment of the present invention instead generates a sequence of embeddings using the expression $z_{t,u}=W_{out}\tanh(W_{enc}h_t \odot W_{pred}g_u+b)$. In contrast to the regular matrix multiplication implemented elsewhere in the expression (e.g. $W_{enc}h_t$ and $W_{pred}g_u$), the Hadamard product $\odot$ is a binary operation that takes as operands two matrices or vectors and produces an output matrix in which each element i, j is the product of elements i, j of the original two matrices or vectors. The input and output matrices all have the same dimensions. Thus, the Hadamard product $\odot$ is also referred to as implementing elementwise multiplication. In other embodiments, the hyperbolic tangent function is replaced by a different non-linear function, for example the sigmoid or the rectified linear unit function.

By implementing elementwise multiplication of corresponding elements of the outputs of the encoder and prediction networks, an embodiment models second order as well as first order interactions between the corresponding elements. In addition, the embodiment still includes additive terms, as in the presently-known implementation. Further, implementing elementwise multiplication in a manner described herein means that each element affects the magnitude of network changes on the other network during end-to-end model training. Experiments conducted using the embodiments described herein also show a reduced error rate, with similar configurations and training times, with respect to presently-known implementations.

An embodiment converts an embedding $z_{t,u}$ to a probability distribution of output symbols, in other words a probability that a particular, current output symbol corresponds to the current portion of input data in the input sequence. One embodiment performs the conversion using a softmax function. A softmax function converts an input vector z of K real numbers into a probability distribution consisting of K probabilities proportional to the exponentials of the input numbers. Some input vector components might be negative or greater than one, and might not sum to 1, but after applying softmax, each component is between 0 and 1, and the components will add up to 1, so that they can be interpreted as probabilities. Larger input components also correspond to larger output probabilities. In other embodiments, the softmax function is replaced by a different function that transforms a set of arbitrary numbers into a probability distribution and which preserves monotonicity, i.e. the higher the number the higher the corresponding probability value.

The manner of multiplicative integration in neural network transducer models for end-to-end speech recognition described herein is unavailable in the presently available methods in the technological field of endeavor pertaining to computer-implemented speech recognition systems. A method of an embodiment described herein, when implemented to execute on a device or data processing system, comprises substantial advancement of the functionality of that device or data processing system in receives an input sequence of audio data, computes an encoder vector and a prediction vector, computes a joint vector combining the encoder and prediction vectors, and converts the joint vector to a probability that a particular symbol corresponds to a portion of input data.

The illustrative embodiments are described with respect to certain types of input sequences, output sequences, audio data, symbols, embeddings, neural network models and components, weights, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
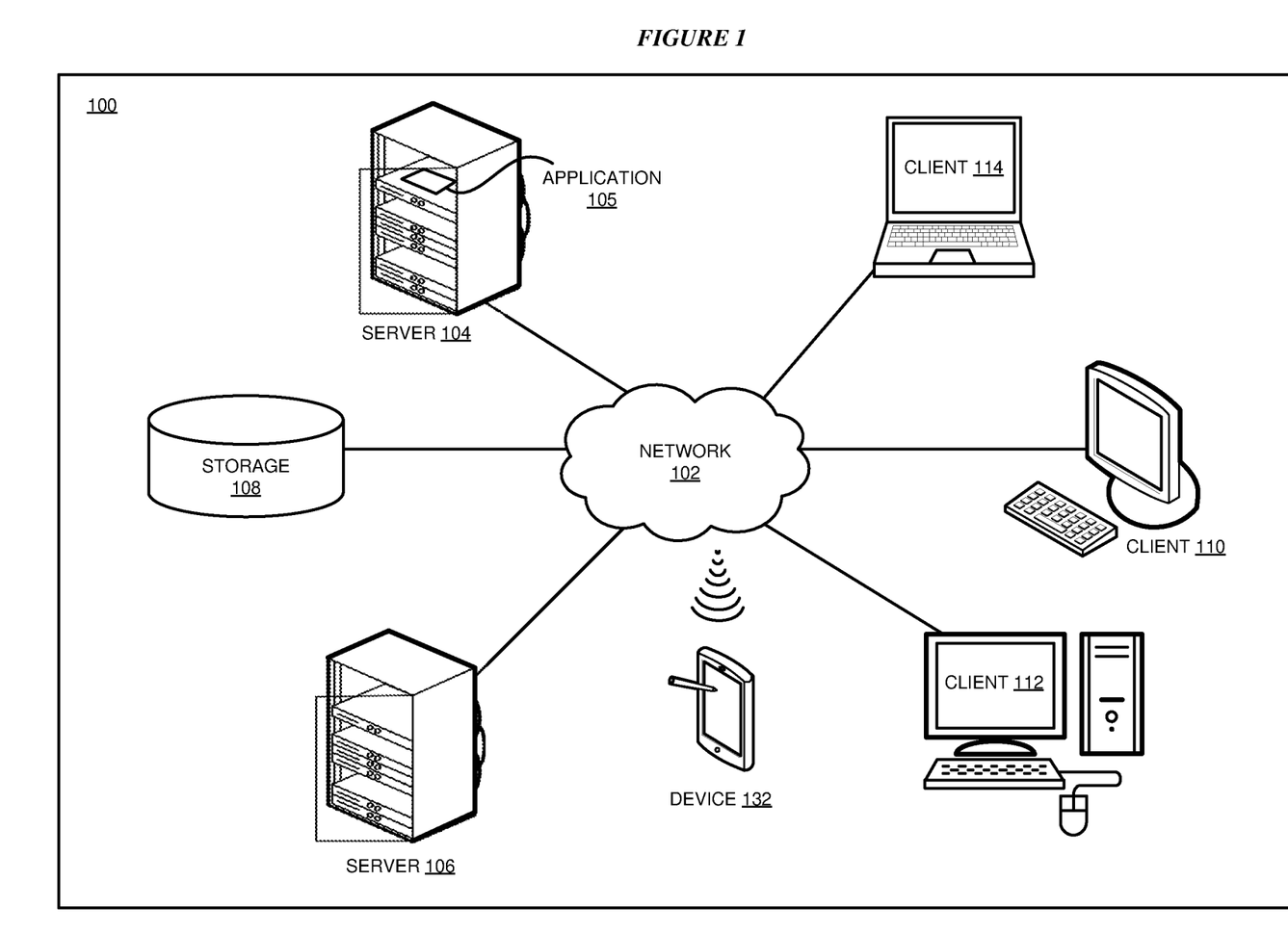
FIG. 1 depicts a block diagram of a network of data processing systems in which illustrative embodiments may be implemented.
Figure 2:
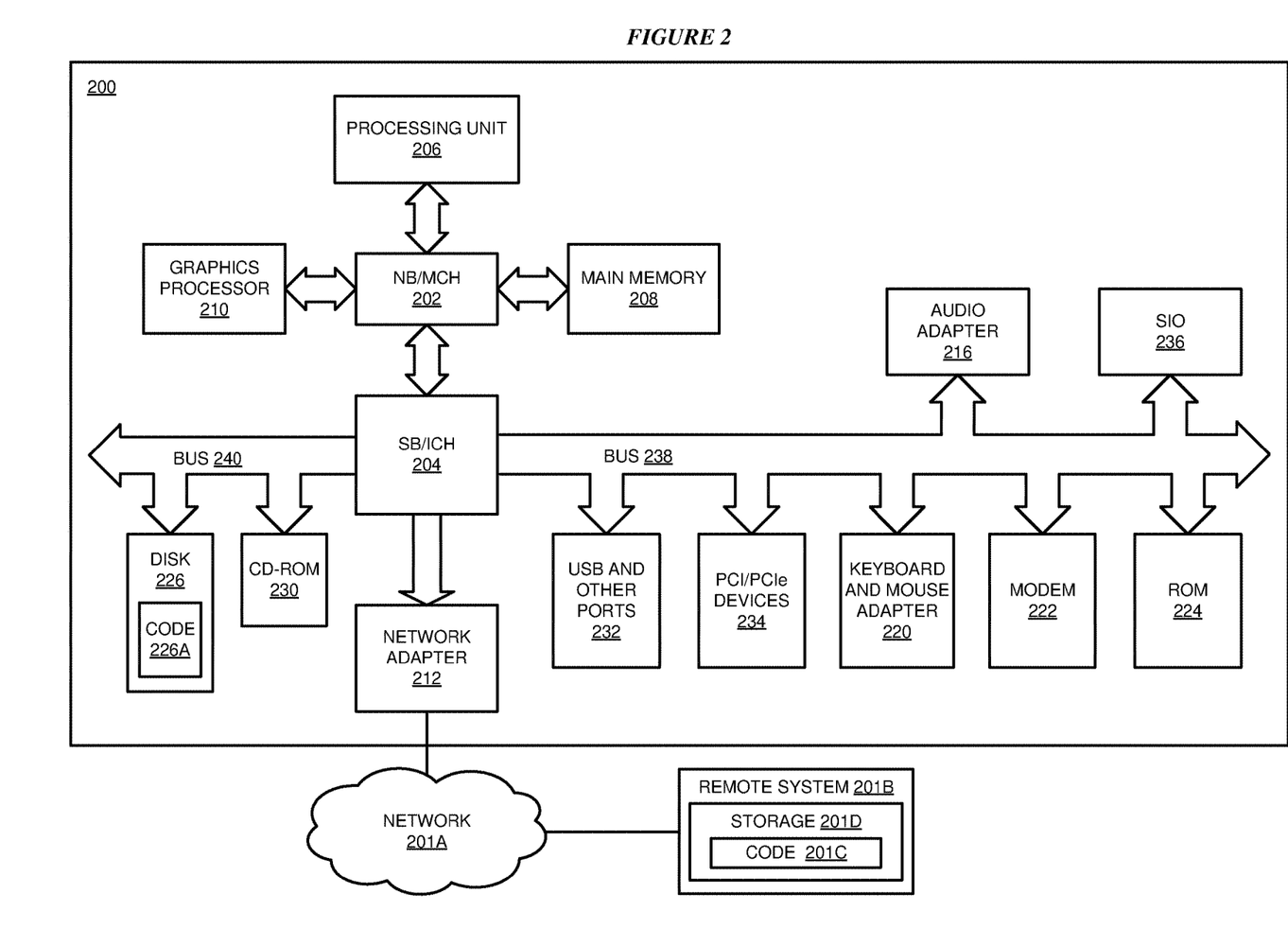
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 can also include a microphone (not shown), used to collect audio data for processing.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
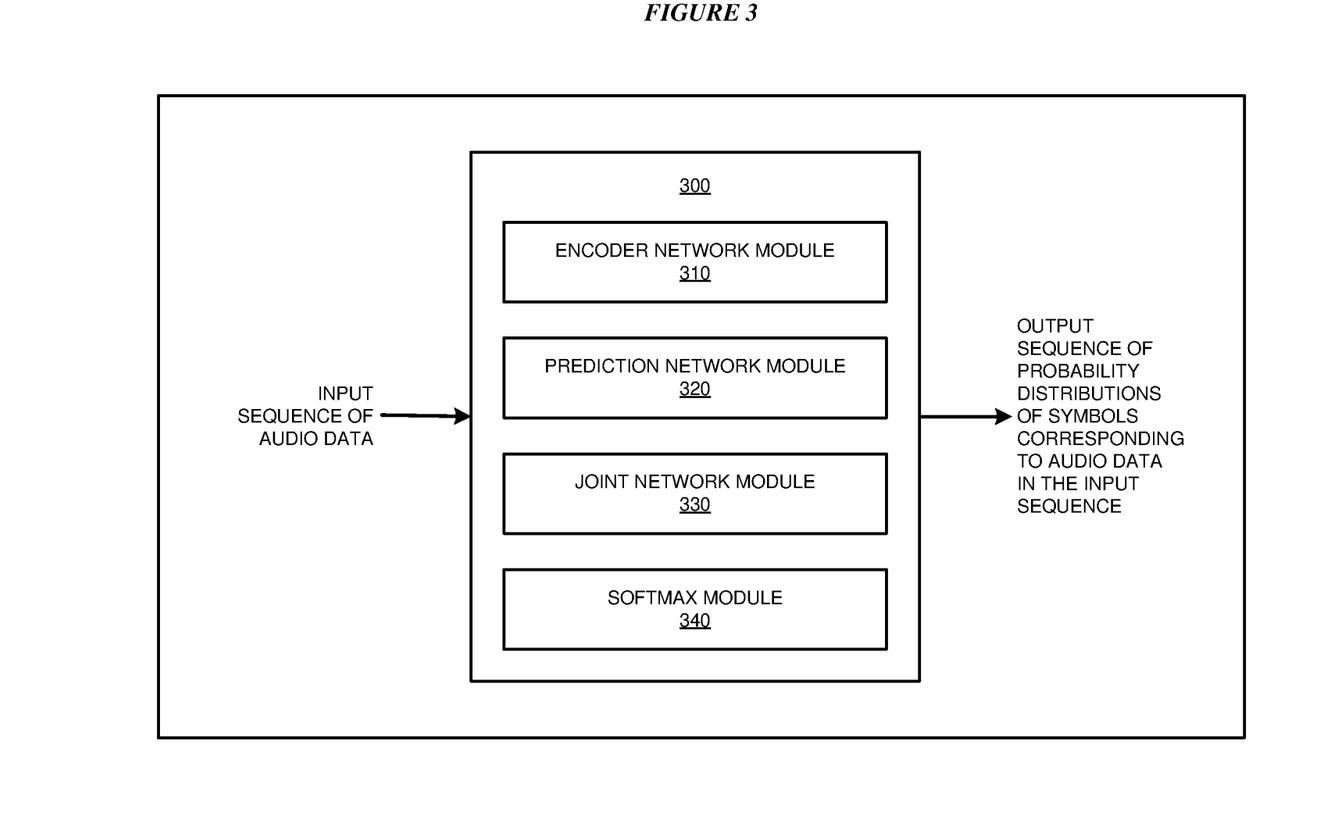
FIG. 3 depicts a block diagram of an example configuration for multiplicative integration in neural network transducer models for end-to-end speech recognition in accordance with an illustrative embodiment.

With reference to FIG. 3, this figure depicts a block diagram of an example configuration for multiplicative integration in neural network transducer models for end-to-end speech recognition in accordance with an illustrative embodiment. Application 300 is an example of application 105 in FIG. 1 and executes in any of servers 104 and 106, clients 110, 112, and 114, and device 132 in FIG. 1.

Application 300 receives, as input, a sequence of portions of audio data. In one implementation of application 300, the audio data is in spectrogram form. The audio data is divided into smaller frames, or portions, each including spectrogram data for a predetermined time period, for example 10 milliseconds.

Application 300 generates an output sequence of symbols corresponding to the input sequence. Some non-limiting examples of output symbols are letters, Asian-language characters, words, morphemes, and the BLANK symbol.

Encoder network module 310 is implemented as a neural network model. Module 310 generates a sequence of embeddings, with each embedding corresponding to an input in the input sequence.

Prediction network module 320 is implemented as a neural network model. Module 320 generates a sequence of embeddings, in which each embedding is based on a previous output symbol in the output sequence and the corresponding previous prediction. In mathematical terms, $g_u$=prediction ($g_{u-1}$, $y_{u-1}$).

Joint network module 330 is implemented as a neural network model. One implementation of module 330 includes three linear layers, each including a set of weighted elements. Values of the weighted elements are set during model training. The joint network also implements a bias parameter, also set during model training. The bias parameter is a vector, with the same number of dimensions as the embeddings that are output from the encoder and prediction networks. Modules 310, 320, and 330 are trained together, as one overall end-to-end speech recognition model.

Module 330 generates a sequence of embeddings, with each embedding based on corresponding outputs of the encoder and prediction networks. In mathematical terms, module 330 generates a sequence of embeddings using the expression $z_{t,u}=W_{out}\tanh(W_{enc}h_t \odot W_{pred}g_u+b)$.

Softmax module 340 converts an embedding $z_{t,u}$ to a probability distribution of output symbols, in other words a probability that a particular, current output symbol corresponds to the current portion of input data in the input sequence, using a softmax function.

Figure 4:
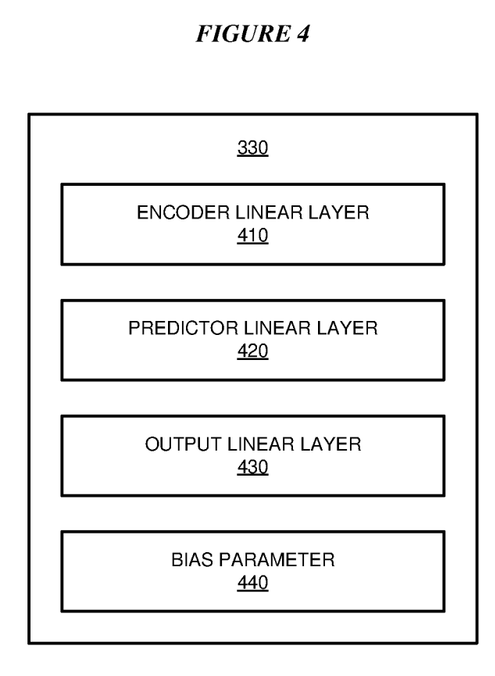
FIG. 4 depicts a block diagram of an example configuration for multiplicative integration in neural network transducer models for end-to-end speech recognition in accordance with an illustrative embodiment.

With reference to FIG. 4, this figure depicts a block diagram of an example configuration for multiplicative integration in neural network transducer models for end-to-end speech recognition in accordance with an illustrative embodiment. In particular, FIG. 4 depicts more detail of joint network module 330 in FIG. 3.

Module 330 includes encoder linear layer 410, predictor linear layer 420, and output layer 430. Each linear layer includes a set of weighted elements. Values of the weighted elements are set during model training. Module 330 also includes bias parameter 440, also set during model training.

Figure 5:
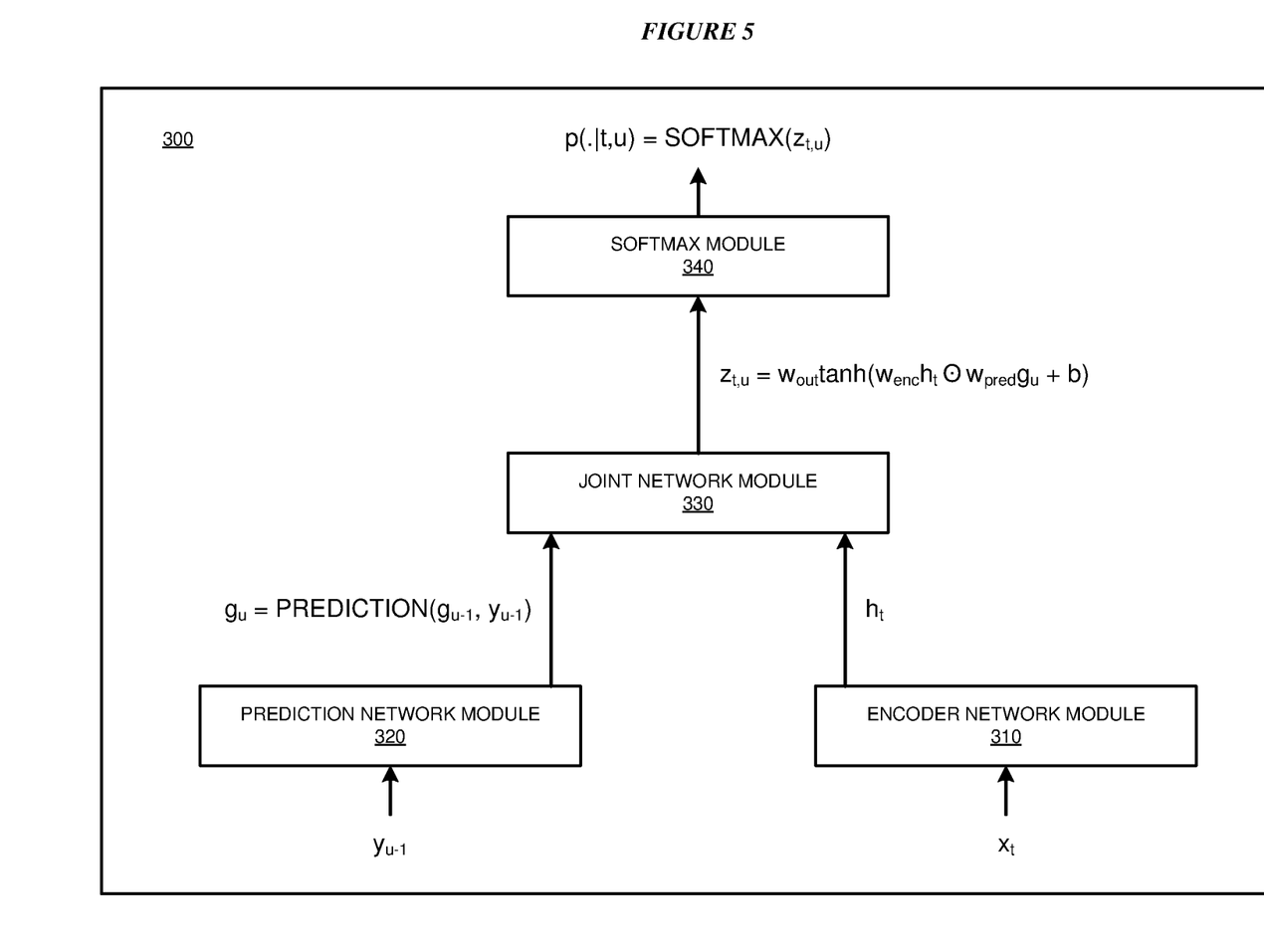
FIG. 5 depicts a diagram of data flow between components of an example configuration for multiplicative integration in neural network transducer models for end-to-end speech recognition in accordance with an illustrative embodiment.

With reference to FIG. 5, this figure depicts a diagram of data flow between components of an example configuration for multiplicative integration in neural network transducer models for end-to-end speech recognition in accordance with an illustrative embodiment. Encoder network module 310, prediction network module 320, joint network module 330, and softmax module 340 are the same as encoder network module 310, prediction network module 320, joint network module 330, and softmax module 340 in FIG. 3.

As depicted, encoder network module 310 takes, as input, current input $x_t$ in input sequence x. Module 310 generates embedding $h_t$ corresponding to current input $x_t$. Prediction network module 320 takes, as input, previous output $y_{u-1}$ in output sequence y. Module 320 generates embedding $g_u$=prediction ($g_{u-1}$, $y_{u-1}$). Joint network module 330 combines $h_t$ and $g_u$, using the expression $z_{t,u}=W_{out}\tanh(W_{enc}h_t \odot W_{pred}g_u+b)$. Finally, softmax module 340 computes probability distribution p(.|t,u), the probability of predicting the next output symbol at time t and symbol position u, by applying the softmax function to $z_{t,u}$.

Figure 6:
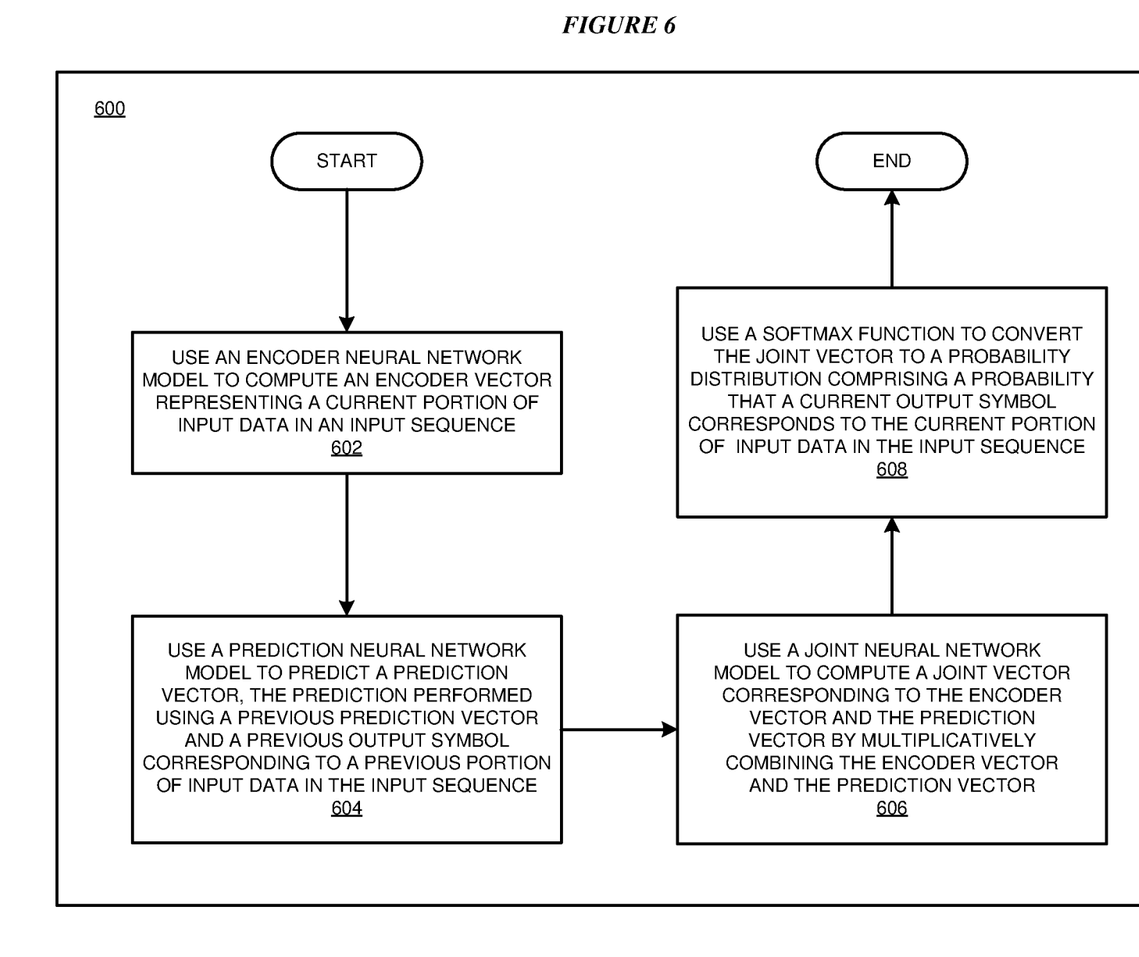
FIG. 6 depicts a flowchart of an example process for multiplicative integration in neural network transducer models for end-to-end speech recognition in accordance with an illustrative embodiment.

With reference to FIG. 6, this figure depicts a flowchart of an example process for multiplicative integration in neural network transducer models for end-to-end speech recognition in accordance with an illustrative embodiment. Process 600 can be implemented in application 300 in FIG. 3.

In block 602, the application uses an encoder neural network model to compute an encoder vector representing a current portion of input data in an input sequence. In block 604, the application uses a prediction neural network model to predict, using a previous prediction vector corresponding to a previous portion of input data and a previous output symbol corresponding to the previous portion of input data, a prediction vector representing a current output symbol. In block 606, the application uses a joint neural network model to compute a joint vector corresponding to the encoder vector and the prediction vector by multiplicatively combining the encoder vector and the prediction vector. In block 608, the application uses a softmax function to convert the joint vector to a probability distribution comprising a probability that a current output symbol corresponds to the current portion of input data in the input sequence.

Figure 7:
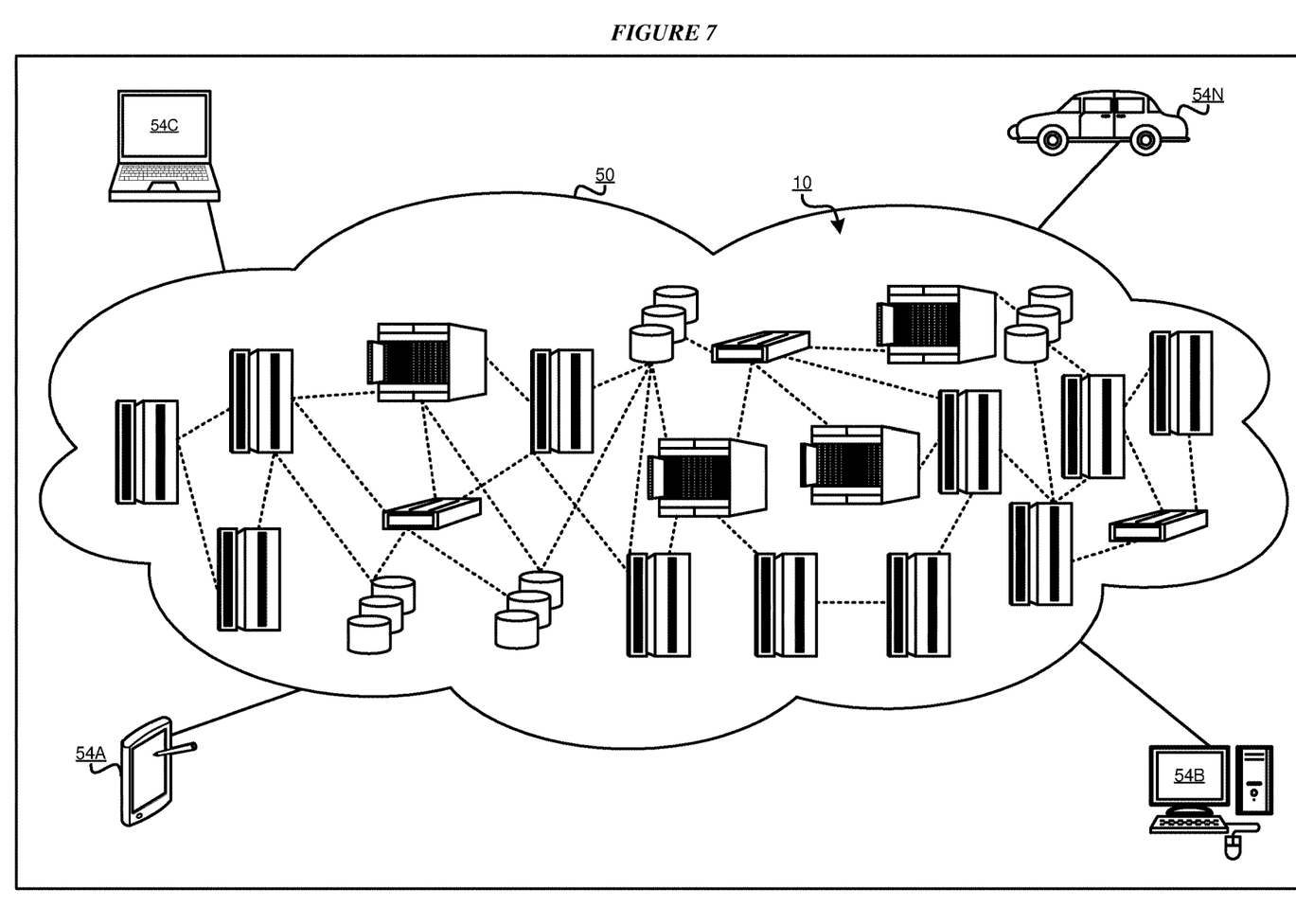
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
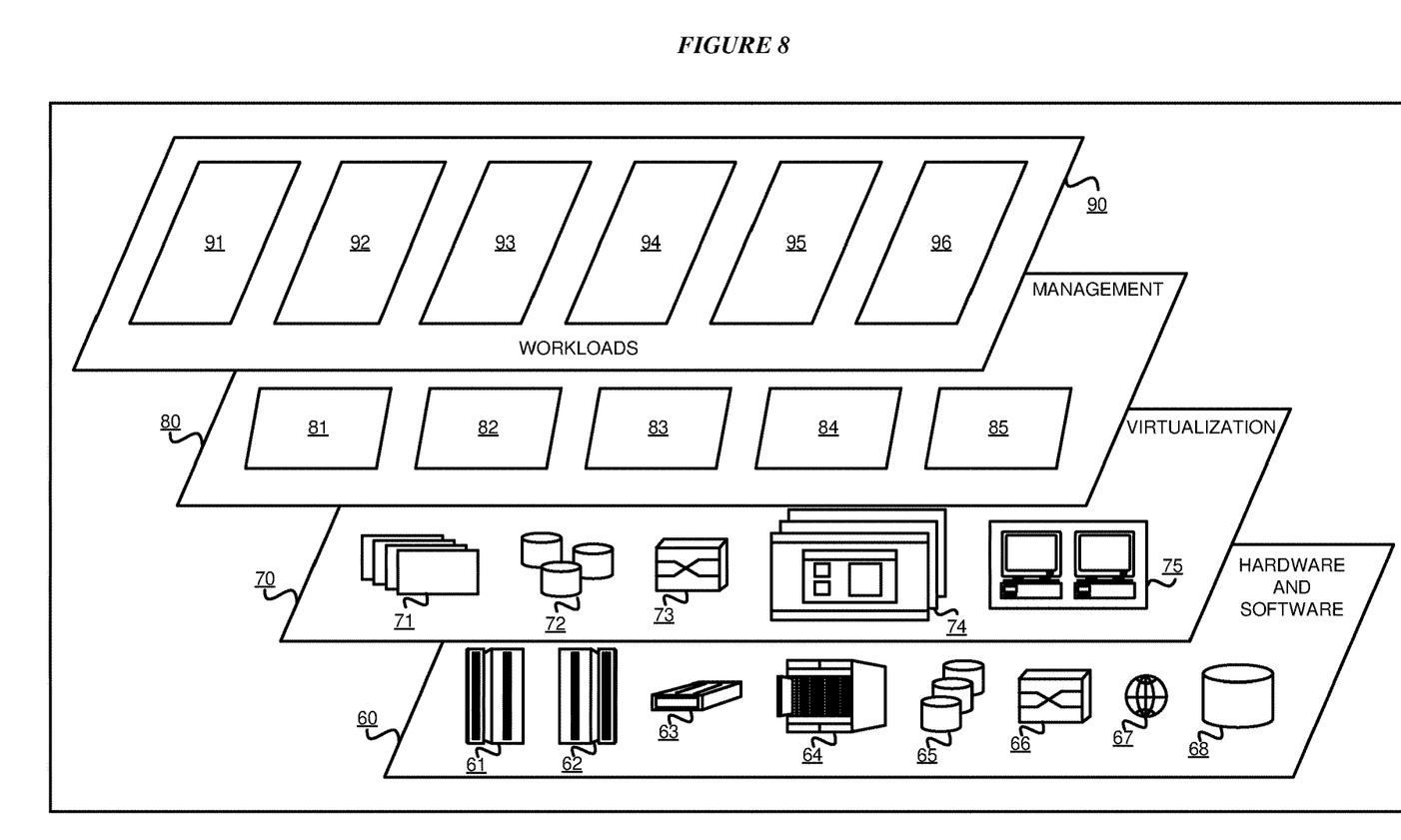
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for multiplicative integration in neural network transducer models for end-to-end speech recognition and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
computing, using an encoder neural network model, an encoder vector, the encoder vector comprising a vector representation of a current portion of input data in an input sequence;
predicting, using a prediction neural network model, a prediction vector, the prediction performed using a previous prediction vector and a previous output symbol corresponding to a previous portion of input data in the input sequence;
computing, using a joint neural network model, a joint vector corresponding to the encoder vector and the prediction vector, the joint neural network model computing a Hadamard product of weighted elements of the encoder vector and weighted elements of the prediction vector; and converting, using a softmax function, the joint vector to a probability distribution comprising a probability that a current output symbol corresponds to the current portion of input data in the input sequence.

2. The computer-implemented method of claim 1, wherein the joint neural network model comprises an encoder linear layer comprising a set of encoder weights, a prediction linear layer comprising a set of prediction weights, and an output linear layer comprising a set of output weights, the encoder linear layer producing the weighted elements of the encoder vector, the prediction layer producing the weighted elements of the prediction vector.

3. The computer-implemented method of claim 2, wherein training the joint neural network model comprises setting the set of encoder weights.

4. The computer-implemented method of claim 2, wherein training the joint neural network model comprises setting the set of prediction weights.

5. The computer-implemented method of claim 2, wherein training the joint neural network model comprises setting the set of output weights.

6. The computer-implemented method of claim 1, wherein the joint neural network model further comprises a bias vector.

7. The computer-implemented method of claim 6, wherein training the joint neural network model comprises setting a set of values of elements of the bias vector.

8. The computer-implemented method of claim 1, wherein the current portion of input data comprises a portion of audio data and the input sequence comprises a set of sequential portions of audio data.

9. The computer-implemented method of claim 8, wherein the current output symbol comprises a textual unit corresponding to the portion of audio data.

10. A computer program product for multiplicative integration in neural network transducer models for end-to-end speech recognition, the computer program product comprising:
one or more computer readable storage media, and program instructions collectively stored on the one or more computer readable storage media, the program instructions comprising:
program instructions to compute, using an encoder neural network model, an encoder vector, the encoder vector comprising a vector representation of a current portion of input data in an input sequence; program instructions to predict, using a prediction neural network model, a prediction vector, the prediction performed using a previous prediction vector and a previous output symbol corresponding to a previous portion of input data in the input sequence;
program instructions to compute, using a joint neural network model, a joint vector corresponding to the encoder vector and the prediction vector, the joint neural network model computing a Hadamard product of weighted elements of the encoder vector and weighted elements of the prediction vector; and
program instructions to convert, using a softmax function, the joint vector to a probability distribution comprising a probability that a current output symbol corresponds to the current portion of input data in the input sequence.

11. The computer program product of claim 10, wherein the joint neural network model comprises an encoder linear layer comprising a set of encoder weights, a prediction linear layer comprising a set of prediction weights, and an output linear layer comprising a set of output weights, the encoder linear layer producing the weighted elements of the encoder vector, the prediction layer producing the weighted elements of the prediction vector.

12. The computer program product of claim 11, wherein training the joint neural network model comprises setting the set of encoder weights.

13. The computer program product of claim 10, wherein the stored program instructions are stored in the at least one of the one or more storage media of a local data processing system, and wherein the stored program instructions are transferred over a network from a remote data processing system.

14. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 10, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to compute, using an encoder neural network model, an encoder vector, the encoder vector comprising a vector representation of a current portion of input data in an input sequence;

program instructions to predict, using a prediction neural network model, a prediction vector, the prediction performed using a previous prediction vector and a previous output symbol corresponding to a previous portion of input data in the input sequence;

program instructions to compute, using a joint neural network model, a joint vector corresponding to the encoder vector and the prediction vector, the joint neural network model computing a Hadamard product of weighted elements of the encoder vector and weighted elements of the prediction vector; and     program instructions to convert, using a softmax function, the joint vector to a probability distribution comprising a probability that a current output symbol corresponds to the current portion of input data in the input sequence.

\* \* \* \* \*